United States Patent [19]

Trott

[11] 4,237,014
[45] Dec. 2, 1980

[54] FLOWABLE MATERIAL PASSAGE WITH INTERPOSABLE SLIDE MEMBER

[75] Inventor: Delano B. Trott, Rowley, Mass.

[73] Assignee: Beringer Co., Inc., Marblehead, Mass.

[21] Appl. No.: 19,159

[22] Filed: Mar. 12, 1979

[51] Int. Cl.$^3$ .......................... B01D 31/28; B29F 3/00
[52] U.S. Cl. .................................. 210/330; 210/352; 210/398; 210/451; 210/455
[58] Field of Search ............... 210/324, 330, 350, 352, 210/483, 488, 435, 445, 446, 447, 451, 455, 463, 359, 398; 425/198, 199

[56] References Cited

U.S. PATENT DOCUMENTS

| 2,640,033 | 5/1953 | Marshall | 425/199 |
| 3,947,202 | 3/1976 | Goller et al. | 425/198 |

*Primary Examiner*—Frank Sever
*Attorney, Agent, or Firm*—Kenway & Jenney

[57] ABSTRACT

Flowable material is pumped between upstream and downstream passages in a body through an aperture portion formed in a slide member that communicates between the passages. An annular seal member engages the slide member under the urging of a Belleville spring. The slide member, formed as a filter, has a region of uniform porosity that is moved progressively through the path of flow of the material for changing the filter.

15 Claims, 4 Drawing Figures

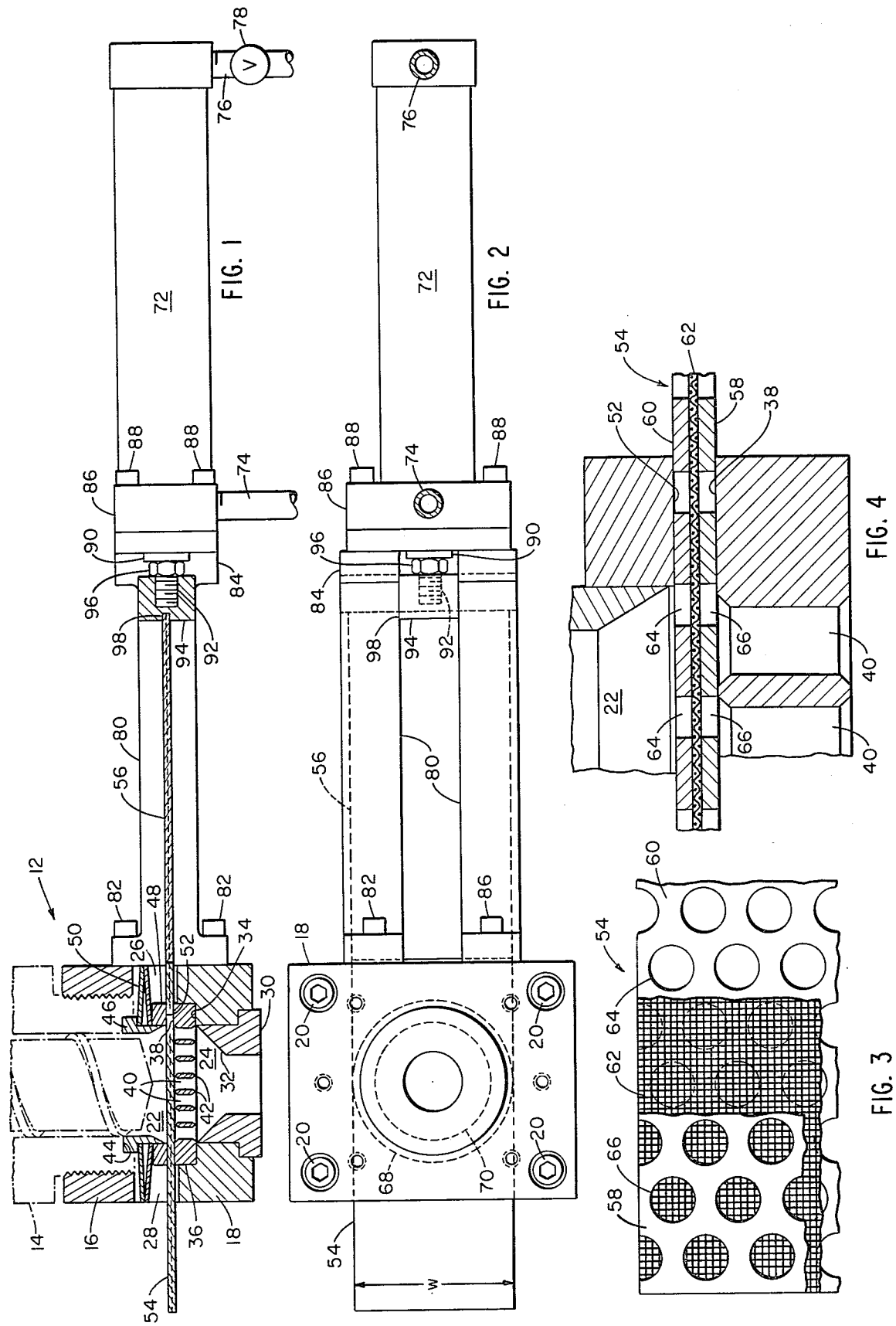

FLOWABLE MATERIAL PASSAGE WITH INTERPOSABLE SLIDE MEMBER

SUMMARY OF THE INVENTION

This invention relates generally to apparatus for use with material flowing through a body, and including a member that is slidable transversely in the body across the flow stream for selective or progressive interposition in the stream. More particularly, it relates to structures forming a seal between the body and the slide member.

An application of this invention relates to filter changers of the type typically employed for the filtration of melt streams of polymers and, in general, any flowable material passing from an extruder. In the past, filter changers have been constructed with a slidable member carrying the filter material and means for adjustably clamping the slidable member so that in operating position it provides a seal that prevents the leakage of polymer through the transverse passage. However, the slidable member must not be clamped so tightly as to interfere with movement of the slidable member.

An object of this invention is to provide an improved mechanical seal for the slidable member, and thereby to eliminate the necessity for adjustment of seal lockup, associated with the use of prior art clamping means. It is desirable for such a seal to be of compact construction and to apply a predetermined effective force directly to the sealing surfaces. It should apply the seal force uniformly to these surfaces with little or no variation in the event of misalignments. It should also compensate for thermal expansion, structural deflections and seal wear. Further, it should allow for less precise and therefore more economical tolerancing of components.

A second object of this invention is to provide filter changers having a substantially uniform and constant active filter configuration throughout the filter changing operation, which may comprise either a continuous or an intermittent movement of the filter.

A third object of the invention, in the filter changer application, is to permit the gradual removal of portions of the filter from the polymer flow path, and the replacement thereof with clean filter portions in a manner having minimal effect on the pressure drop across the filter, and without the introduction of air into the melt stream.

The problems arising from sudden changes in the pressure drop are typified by the conventional slide-plate filter screen changer. A typical changer of this type incorporates a slide plate containing openings for two breaker plates, recessed into the slide plate to hold a screen pack. In operation, one breaker plate and screeen pack are in the polymer flow, while the other breaker plate and screen pack are being cleaned. When the screen pack in the polymer flow has become sufficiently blinded, that is, filled with impurities filtered out of the polymer, the slide plate is rammed across the polymer stream, usually by a hydraulically powered cylinder, and the clean breaker plate is put into position for filtering. The sudden change in pressure drop results from the replacement of a substantially blinded or plugged screen pack with a clean one. This pressure phenomenon may be termed a "saw-tooth characteristic."

Cartridge screen changers comprise a development from conventional slide-plate changers. The slide plate is eliminated, and independently removable cartridges are aligned for consecutive advancement into the flow stream. In cartridge changers adapted for the sudden replacement of each cartridge with the next, the same problem as that characterizing the slide-plate changer exists, namely, the production of a sudden change in the pressure drop across the screen. On the other hand, in cartridge changers adapted to impart small incremental or continuous movements to the cartridges for the purpose of minimizing such sudden changes, the structures of the cartridges are such as to present non-uniform filter configurations within the polymer stream. Typically, such cartridges comprise solid frames having central apertures in which the screens are received. As the solid marginal portions of these frames advance through the polymer flow stream, they may present substantial areas thereto comprising barriers around which the polymer must flow. This occurs whenever a cartridge is only partially situated within the polymer flow stream. Further, since the screen pack comprises the major flow restriction, the cartridge is effectively fully on-line after it has entered only a short distance into the flow stream. This also results in a "saw-tooth characteristic."

Another object of the invention is to provide a filter changer in which the filter is so constructed as to mechanically prevent the appreciable flow of polymer laterally from the flow passage between the seals of the slide or filter member.

With the foregoing and other objects in view, as hereinafter appearing, this invention includes a body having upstream and downstream passages respectively communicating with a slide member. A seal member has a surface urged into sealing engagement with the slide member at an end of a passage. The urging force may be advantageously applied by spring means situated around and external to the polymer flow passage. In particular, a Belleville spring around and external to the passage is preferred because of its ability to exert high forces while being contained within a compact space.

In a filter changer application, the invention also features a filter movable through a filter channel to advance a portion of the filter progressively into sliding engagement with and over upstream and downstream seals, and over openings in the seals that respectively communicate through a portion of the filter between the upstream and downstream polymer flow passages. That portion of the filter that slidably engages with the seals and enters into these openings comprises a region of uniform porosity, thus presenting a substantially uniform and constant active filter configuration within the polymer flow stream at all times during the changing operation, and in all positions of the filter within and relative to the polymer flow stream.

Another feature comprises a filter plate structure in which the screen may be made either impermeable, or selectively permeable to gas flow laterally between the seals, thus allowing air to be expelled from the interstices of the filter before it enters into the polymer flow stream. In the latter case, the air is forced back toward the entrance port of the filter channel by the polymer under pressure from the extruder.

BRIEF DESCRIPTION OF THE DRAWING

FIG. 1 is a plan view in section showing an extruder equipped with a preferred form of filter changer according to this invention.

FIG. 2 is a front elevation corresponding to FIG. 1.

FIG. 3 is a fragmentary detailed elevation of one embodiment of the filter comprising a filter plate.

FIG. 4 is a fragmentary plan view in section showing details of the filter plate.

DETAILED DESCRIPTION

Referring to the drawing, a conventional extruder for heated flowable plastic material is shown at 12. The extruder has a cylindrical body 14 threaded for mounting an upstream body 16. In front elevation this body has the same rectangular peripheral outline as a downstream body 18, as viewed in FIG. 2. The bodies 16 and 18 are secured together by four screws 20. The upstream body 16 defines an upstream passage 22 and the downstream body 18 defines a downstream passage 24.

A slide or filter channel is formed by rectangular apertures 26 and 28 formed in and between the bodies 16 and 18, the aperture 26 comprising an entrance port and the aperture 28 comprising an exit aligned therewith.

The downstream body 18 has a reducer bushing 30 within the downstream passage and fitted on an annular shoulder in the body. The bushing has a tapered surface 32 formed to facilitate polymer flow, avoiding the formation of polymer retention regions that might result in nonuniformities thereof.

Adjacent the filter channel, the body 18 has an annular inner shoulder 34 in which is fitted a seal and bearing plate 36. This is a round plate of uniform thickness somewhat exceeding the depth of the shoulder 34. The plate has a flat, circular and annular sealing surface 38 located within the filter channel, and a circular opening defined by this surface that communicates between the filter channel and the downstream passage 24. This opening comprises a plurality of apertures 40 formed in the plate 36 by drilling holes therethrough in a uniform pattern, thus providing lands 42.

The body 14 has an inner annular shoulder 44 receiving an adaptor ring 46. An upstream seal ring 48 is slidable over a cylindrical external surface on the ring 46, forming therewith a seal effective against the penetration of polymer. A Belleville spring 50 is supported under compression between the adaptor ring and the seal 48. This spring is of conventional construction, and typically comprises a number of dished washerlike elements forming a stack for compression loading. This form of spring is capable of providing the high pressures required for an effective seal. The seal 48 has a flat circular sealing surface 52 located within the filter channel and urged by the spring toward the surface 38 of the downstream seal.

Slidable between the sealing surfaces 38 and 52 there is located a rectangular slide member comprising a filter plate 54. Abutting an edge of this plate is a second filter plate 56 of identical construction. This construction is more particularly shown in FIGS. 3 and 4.

Each filter plate comprises a laminated structure having a pair of flat metal plates 58 and 60 and a woven metal screen 62 between the plates. The plate 58 comprises a support plate and the plate 60 comprises a bearing plate. Although this embodiment is shown with one screen and two plates 58 and 60, other embodiments may be constructed with one plate which is the bearing plate, or with more than two plates, and with more than one screen. The screen or screens are calendered to reduce their permeability so that there will be no appreciable polymer flow internally thereof into the filter channel, and the screens may be bonded to one another and/or to the plates to form a permanent rigid structure.

As shown, the entire area of the bearing plate 60 has formed therein a plurality of upstream perforations 64 forming a uniform pattern. Similarly, the entire area of the plate 58 has formed therein a plurality of perforations 66 forming a uniform pattern in registration with the perforations 64. The width "w" of the filter plate is preferably not less than the outermost diameter of the sealing surfaces 38 and 52, represented by a broken outline 68 in FIG. 2. A broken outline 70 represents the inner diameter of the sealing surfaces.

Thus the movement of the filter plate through the filter channel causes portions thereof to move progressively into sliding engagement with and over the sealing surfaces, and thence into the openings defined thereby. These portions lie within a region of the surface of the filter plate that has uniform porosity as shown in FIG. 3, this region including all such portions passing at any time within the outline 70. More specifically, within the outline 70, both the pattern formed by the perforations 70 and the porosity of the screen or screens with respect to polymer flow between the passages remain uniform as the filter plate moves through the filter channel. By reason of the construction described, at any position of the filter plate with respect to the polymer flow channels a substantially uniform and constant active filter configuration is situated within the polymer flow stream.

The maximum lateral dimension or diameter of each of the perforations 64 and 66 is smaller than the width of the sealing surface 38 or 52 over which it passes, the latter width being equal to the radial distance between the outlines 68 and 70. Thus in every position of the filter plate, the sealing surfaces 38 and 52 are effective to prevent polymer flow laterally of and external to the filter plate.

Moreover, the maximum lateral dimension of each of the perforations 64 and 66 is very much smaller than the cross sectional area of the polymer flow openings defined by the sealing surfaces 38 and 52. Therefore, even though small transitional changes occur in the effective areas of the apertures 64 and 66 as they enter and leave the openings within the sealing surfaces, the total of the effective aperture areas within the openings remains substantially constant. This prevents any sudden changes in the pressure differential across the filter plate when it is advanced at a substantially uniform rate. It will be noted that the construction described provides a direct, compact and effective means of applying the necessary seal force through an internally mounted spring. The use of this spring arrangement provides a uniform application of sealing force between the surface 52 and the surface of the bearing plate 60, which will result in even seal wear and leak-free operation. This arrangement also allows the seal to compensate for thermal expansion, structural deflection and seal wear. In addition, because of the inherent compensating characteristics of the spring mechanism, there is allowance for less precise, and therefore more economical, tolerancing of the parts. Finally, this arrangement eliminates all requirements for seal lockup adjustments by the operator, since a predetermined seal force is applied when the unit is assembled and operated within the specified design limits.

As seen more particularly in FIG. 4, the screen 62 comprises woven strands, preferably of metal, between and through which air but no appreciable amount of polymer may flow internally thereof and laterally between the plates 58 and 60. When each of the perforations 64 and 66 enters the polymer flow channel, polymer fills the aperture, flowing between and around the strands of the screen 62 in the direction of the flowing stream. This flow occurs throughout each aperture and is accompanied by the application of pressure to the screen portions immediately surrounding the aperture. The screen is constructed to permit the flow of gas internally thereof laterally between the plates in the regions adjacent the apertures, thus preventing the air that was initially present in the interstices of the screen from entering the polymer stream.

Alternatively, the screen may be constructed so that gas cannot pass internally through it laterally between the plates in any direction external to the outline 70 but may be expelled to the space external to the filter changer by leakage along the surfaces 38 and 52.

In place of the filter plate 54 constructed as shown, other forms of filter may be used. These may comprise porous bodies formed of sintered metals, flat metal sheets made porous by electrochemical etching or other processes, or diffusion-bonded mats. These forms may comprise either a laminated construction or they may be monolithic, non-laminated sheets. In any case, for the reasons noted above, they are preferably constructed so that the portions that progress into sliding engagement with the sealing surfaces and into the openings in the seals are within a region of uniform porosity.

In the practice of this invention, the entire structure of the filter changer adjacent the polymer flow stream is maintained at a sufficiently high temperature to ensure the fluidity of the polymer. In some applications this structure may even be maintained at a higher temperature than the polymer by any one of the common methods of heating, such as electrical resistance heating or steam heating. Apparatus for this purpose has been omitted from the drawing for the sake of clarity. It will be obvious that for acceptable operation of the apparatus, the exact temperature is not of critical importance with respect to either the formation of seals at the entry and exit ports of the filter channel or the rate of advancement of the filter into and out of the polymer flow stream.

The filter is preferably advanced by pushing or pulling it either continuously at a slow rate, or by a series of consecutive incremental intermittent small movements each being a small fraction of the diameter of the active portion of the filter within the polymer flow stream. Preferably the filter is pushed through the filter channel by a suitable pneumatic or hydraulic mechanism. For illustration, the drawing shows a hydraulic mechanism having a cylinder 72. The cylinder has connections 74 and 76, one of which is fitted with a metering valve or other conventional flow control device 78 for limiting the force or impulse applied to the filter plate. The filter is mounted on four guide bars 80 fastened by screws 82 to the upstream and downstream bodies 16 and 18. Flanges 84 on the guide bars are fastened by screws 88 to a head plate 86 on the cylinder. The cylinder has a piston 90 with an end 92 threaded into a blind hole in a pusher block 94. A lock nut 96 ensures a tight connection to the pusher block. The pusher block is guided by the guide bars 80 as it advances. A slot 98 in the pusher receives one end of the filter 56, this filter being guided laterally between the guide bars 80 and abutting the preceding filter 54.

After the pusher block has advanced the filter 56 by a distance exceeding its length, hydraulic pressure may be applied to the connection 74 to retract the pusher block and to permit the insertion of a clean filter plate.

It will be appreciated that a number of means are available in the art for controlling the rate of advancement of the filter, the sizes of incremental movements, their frequency and the relationship of these parameters to the quantity of contaminants accumulated in any given time interval on the active portion of the filter plate. These contaminants accumulate within the apertures 64 on the upstream side of the filter, from which they are eventually removed when the plate is cleaned. These apertures become progressively blinded or clogged, thereby tending to increase the pressure drop across the filter. If desired, conventional pressure detectors may be introduced in the polymer flow passages and connected to associated controls for the hydraulic cylinder 72. Such controls may operate to increase the rate of advancement of the filter with any increase in the rate of accumulation of contaminants.

It will be evident that the thicknesses of the plates 58 and 60 in the particular embodiment shown may be the same or different, that of the plate 60 being chosen to provide apertures 64 of the requisite volumetric capacity for receiving the contaminants, and that of the plate 58 being chosen to provide adequate stiffness to withstand the applied polymer pressure.

I claim:

1. Means for filtration of a flowable material comprising, in combination,
    a body defining upstream and downstream passages and having a transverse filter channel and a closed annular flat first sealing surface defining a first opening communicating between one of said passages and said channel,
    a seal member having a closed annular flat second sealing surface directly opposing said first sealing surface and defining a second opening opposing said first opening, said second opening communicating between the other of said passages and said channel,
    a filter movable through the filter channel and comprising a flat bearing plate in slidable contact with one of said sealing surfaces and a filter sheet between the bearing plate and the other of said sealing surfaces,
    means to move the filter from a first position to a second position relative to said openings, and
    means urging the seal member and said filter toward one another and adapted to produce a sealing force therebetween which is constant and uniformly distributed over the contacting surfaces thereof at all positions of the filter in said movement, the bearing plate having a pattern of perforations covered by said filter sheet and dimensioned relative to the sealing surfaces so that at all positions of the filter in said movement, flow of material into said channel through the perforations at the sealing surfaces is prevented and a substantially uniform and constant configuration of the filter is in communication with said passages.

2. The combination according to claim 1, in which the filter sheet is impermeable to gas flow internally thereof in any direction external to said openings.

3. The combination according to claim 1, in which said filter sheet has a region of uniform porosity with a termination external to the body, said region being permeable to gas flow internally thereof between said openings and said termination.

4. The combination according to claim 3, in which said region has a substantially limited permeability to flow of said material internally thereof between said openings and said termination.

5. The combination according to claim 3, in which the filter sheet comprises a woven wire mesh calendered to impart a predetermined permeability to gas internally thereof between said openings and said termination.

6. The combination according to claim 1, in which the filter comprises a pair of plates respectively sealingly slidable on said first and second surfaces and a filtering medium therebetween, said plates each having a plurality of perforations forming a uniform pattern within said openings, the maximum dimension of each perforation being smaller than the width of the surface over which it passes.

7. The combination according to claim 6, in which the filtering medium is bonded to the pair of plates.

8. The combination according to claim 6, in which the filtering medium is permeable to gas flow internally thereof and laterally between said openings and space external to said body.

9. The combination according to claim 1, in which the first sealing surface is formed by a grille plate having a central perforated portion slidably bearing on and supporting the portion of the filter within said first opening.

10. The combination according to claim 1, in which the seal member comprises a ring sealingly slidable in the body longitudinally of the upstream passage.

11. The combination according to claim 9, having a compression spring external to the upstream passage and exerting force between the body and the seal member.

12. The combination according to claim 10, in which the spring is a Belleville spring.

13. The combination according to claim 1, in which the filter sheet comprises a layer of woven wire mesh.

14. The combination of claim 1, in which the means to move the filter are adapted to advance it at a substantially constant rate.

15. The combination of claim 1, in which the means to move the filter are adapted to advance it in incremental steps that are small in relation to the lateral dimensions of said openings.

* * * * *

UNITED STATES PATENT AND TRADEMARK OFFICE
CERTIFICATE OF CORRECTION

PATENT NO. : 4,237,014
DATED : December 2, 1980
INVENTOR(S) : Delano B. Trott

It is certified that error appears in the above-identified patent and that said Letters Patent are hereby corrected as shown below:

Column 8, line 11, cancel "9" and substitute --10--;
line 15, cancel "10" and substitute --11--.

Signed and Sealed this

Sixteenth Day of March 1982

[SEAL]

Attest:

GERALD J. MOSSINGHOFF

Attesting Officer    Commissioner of Patents and Trademarks